United States Patent [19]
Zemanek et al.

[11] 3,790,074
[45] Feb. 5, 1974

[54] UNIVERSAL UNIT-CONVERTING SLIDE RULE

[76] Inventors: Rudolph Zemanek; Elena Zemanek, both of Box 297, South International Falls, Minn. 56649

[22] Filed: Apr. 12, 1973

[21] Appl. No.: 350,314

[52] U.S. Cl. ............... 235/89 R, 235/70, 35/31 E
[51] Int. Cl. ............................................. G06c 3/00
[58] Field of Search.. 235/70, 78, 85, 88, 89; 35/30, 35/31 A, 31 E

[56] References Cited
UNITED STATES PATENTS

| | | | |
|---|---|---|---|
| 3,282,500 | 11/1966 | Pikus | 235/70 A |
| 3,432,942 | 3/1969 | Jack | 35/31 A |
| 3,544,768 | 12/1970 | Warner | 235/88 |
| 3,685,727 | 8/1972 | Brookes | 235/70 R |

Primary Examiner—Lawrence R. Franklin
Attorney, Agent, or Firm—John W. Adams

[57] ABSTRACT

This is a slide rule for quickly converting from one unit of measure to another and includes scale indicia for accurately and quickly determining the position of the decimal point in the computed answer.

2 Claims, 3 Drawing Figures

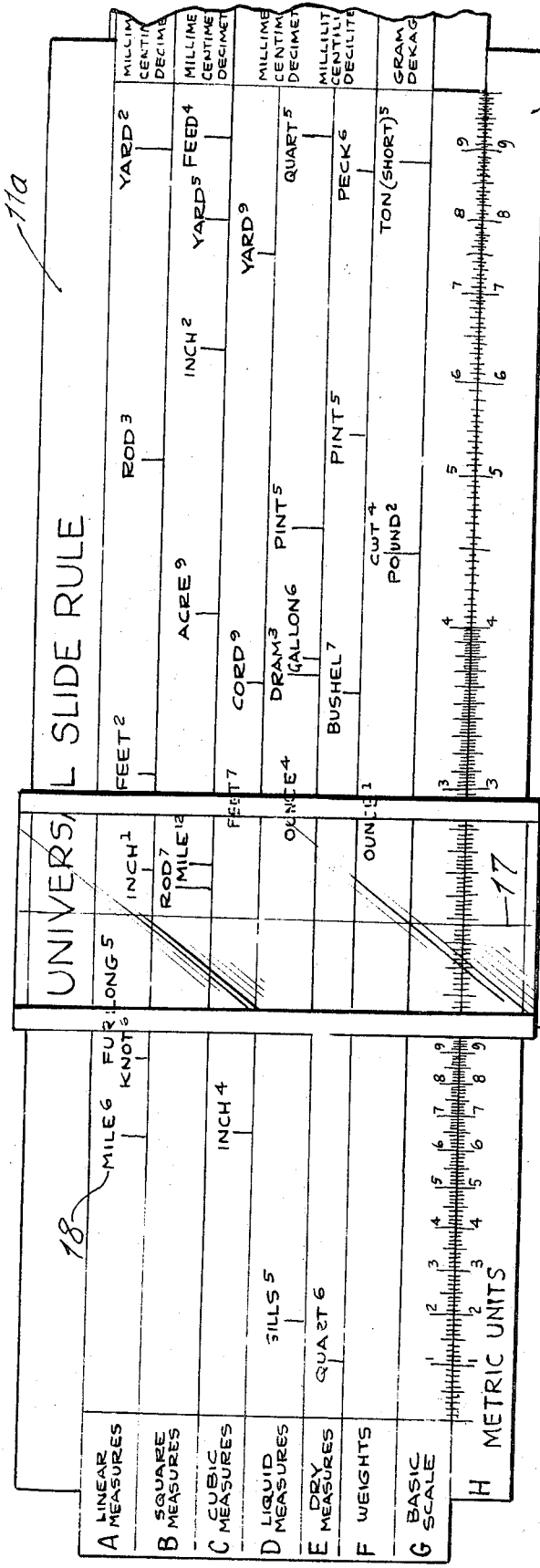
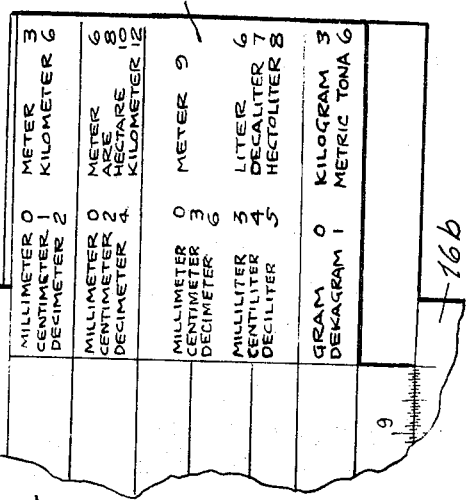
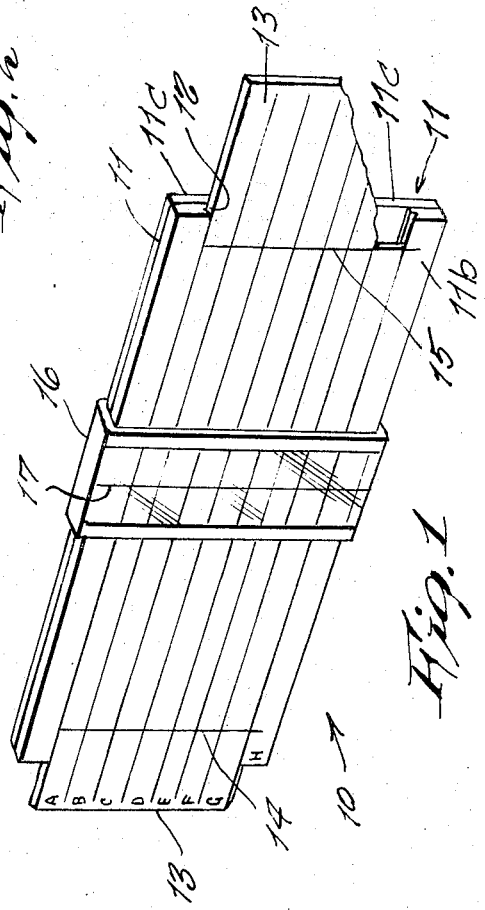

UNIVERSAL UNIT-CONVERTING SLIDE RULE

It is a general object to provide a slide rule which is adapted to multiply and divide numbers, and convert one unit of measure to another such as for example English units to Metric units and vice versa, English units to other English units, money currency units of one country to that of another, etc.

It is another object of the present invention to provide a slide rule device specifically constructed to quickly compute the conversion equivalent from one unit of measure to another and for accurately and quickly indicating the position of the decimal point in the computed answer.

These and other objects and advantages of this invention will more fully appear in the following description made in connection with the accompanying drawings in which like reference characters refer to similar parts throughout the several views, and, in which:

FIG. 1 is a perspective view of a "universal" slide rule construction embodying this invention;

FIG. 2 is a front elevational view of a "universal" slide rule shown in FIG. 1; and FIG. 3 is a fragmentary front elevational view showing one end portion of the slide member with the decimal point determining exponents indicated thereon.

As illustrated in the accompanying drawing we provide a slide rule 10 having a stationary mounting structure 11 in the form of two parallel spaced apart stationary bar members 11a and 11b rigidly connected by a suitable backing member 11c. In the form shown a basic multiplying and dividing Scale H is provided on the lower stationary bar member 11b. A movable slide member 13 is mounted in a suitable groove or track 12 provided in bar members 11a and 11b. The slide 13 has a pair of index lines 14 and 15 indicating the respective ends of the various scales provided thereon.

In the form of the invention illustrated the slide member 13 is provided with seven different scales respectively designated by the letters A, B, C, D, E, F and G. The Scale G is a basic multiplying and dividing scale similar to the Scale H and combines therewith to permit multiplying and dividing computation in the same manner as with conventional slide rules. As indicated on the drawing the A scale relates to Linear Measures and the indicia marks on the A scale represent a conversion of the indicated unit of measure into millimeters so that regardless of the unit being converted the millimeter constitutes the single basic unit to which all other units are converted. For example, a mile represents 1,609,344.0 millimeters and this number of millimeters is read by moving the cursor member 16 so that its hairline 17 is in registration with the mile indicia mark and the millimeter conversion equivalent is indicated by the registration of the hairline at 1.61 on the Basic Scale H. The exponent characteristic is indicated adjacent the identifying word for the respective unit of measure, e.g.: "MILE$^6$" which is identified by the reference numeral 18 in FIG. 2. In other words one mile equals $1.61 \times 10^6$ millimeters. The Metric units on the right side of the slide 13 are Metric units which can be converted into the respective English units which are in the Scales A, B, C, D, E and F.

Scale B represents units of Square Measure with the appropriate exponent characteristic and square millimeter equivalent value is read on Basic Scale H.

Scale C represents units of Cubic Measure in the cubic millimeter equivalent in the manner described above.

With respect to Liquid Measures the milliliter is the basic unit of measure and the indicia marks on Scale D are aligned with the milliliter equivalent value on Scale H and include the exponent characteristic of the indicated units to be converted.

Scale E represents the Dry Measure units also to be converted to milliliters and the appropriate exponent characteristics are indicated thereon.

The basic weight unit of measure is the metric gram and the indicia marks on Weight Scale F are aligned with the respective gram equivalent values on Basic Scale H.

The following is an example of a conventional computation.

Problem (1): Convert 1500 FEET to millimeters,

Set the left index mark 14 of the slide 10 over the number indicia 15 on the H Scale. Move the cursor cross hair 17 to the indicia mark "FEET$^2$" on the A Scale. The conversion answer in metric units can be read at the location where the cross hair 17 registers on the H Scale, to-wit, 457.

To determine the decimal point simply add up the exponent characteristics of the numbers being multiplied:

| | |
|---|---|
| The characteristic of "FEET$^2$" is | 2 |
| The characteristic of 1500 is | $3(1.5 \times 10^3)$ |
| The characteristic of millimeters | $-0$ |
| Total | 5 |

Therefore 1500 feet = $4.57 \times 10^5$ millimeters or 457,000 millimeters.

If 1500 feet were to be converted directly to meters instead of millimeters the exponent computation would be as follows:

The adjusting of the slide rule would be the same as in Example (1), also the result number will be the same — 457. The difference is in the computation of the exponent.

| | |
|---|---|
| The characteristic of "FEET$^2$" is | 2 |
| The characteristic of 1500 is | $3(1.5 \times 10^3)$ |
| The characteristic of meter is | $-3$ |
| Total | 2 |

Therefore 1500 feet = $4.57 \times 10^2$ meters or 457 meters.

The indicator markings (or indicia) on the other scales are positioned to register with the metric equivalents on the H Scale and the converting procedure is similar to that described above including the determination of the decimal point.

It will, of course, be understood that various changes may be made in the form, details, arrangement and proportions of the parts without departing from the scope of this invention as set forth in the appended claims.

What is claimed is:

1. A universal unit-converting slide rule comprising
   a stationary mounting structure,
   a slide member slideably mounted for back and forth movement on said stationary structure,
   a slideable cursor member slideably mounted on said supporting structure and including a hairline fixed thereto and extending transversely across the face of said slide member and said mounting structure, a plurality of scales provided on the face of said slide member including a basic unit conversion multiplying and dividing scale and a number of convertible unit scales having unit indicia thereon positioned to permit the conversion equivalent in the predetermined basic units to be read directly on said basic unit conversion scale, and a multiplying and dividing scale on said stationary mounting structure similar to said basic unit conversion multiplying and dividing scale on said slide to permit multiplying and dividing of the converted basic units.

2. The structure set forth in claim 1 and each of the convertible unit scale indicia including the exponent characteristic thereof to facilitate determining the decimal point of the converted answer.

* * * * *